United States Patent
Kalaimalai et al.

(10) Patent No.: US 12,499,123 B2
(45) Date of Patent: Dec. 16, 2025

(54) ACTOR-BASED INFORMATION SYSTEM

(71) Applicant: ADP, INC., Roseland, NJ (US)

(72) Inventors: Madhu Kalaimalai, Pasadena, CA (US); Ajit Sri Kumar, San Dimas, CA (US); Joseph Dela-Cruz, Pasadena, CA (US); Neeraj Gupta, San Jose, CA (US)

(73) Assignee: ADP, Inc., Roseland, NJ (US)

( * ) Notice: Subject to any disclaimer, the term of this patent is extended or adjusted under 35 U.S.C. 154(b) by 80 days.

(21) Appl. No.: 18/110,649

(22) Filed: Feb. 16, 2023

(65) Prior Publication Data

US 2023/0281214 A1  Sep. 7, 2023

Related U.S. Application Data

(63) Continuation of application No. 16/162,058, filed on Oct. 16, 2018, now abandoned.

(51) Int. Cl.
*G06F 16/25* (2019.01)
*G06Q 10/10* (2023.01)
*G06Q 40/12* (2023.01)

(52) U.S. Cl.
CPC .......... *G06F 16/258* (2019.01); *G06F 16/252* (2019.01); *G06Q 10/10* (2013.01); *G06Q 40/12* (2013.12)

(58) Field of Classification Search
CPC ..... G06F 16/258; G06F 16/252; G06Q 10/10; G06Q 40/12
See application file for complete search history.

(56) References Cited

U.S. PATENT DOCUMENTS

| | | |
|---|---|---|
| 7,073,129 B1 | 7/2006 | Robarts et al. |
| 2003/0191719 A1 | 10/2003 | Ginter et al. |
| 2009/0144319 A1 | 6/2009 | Panwar et al. |
| 2010/0049874 A1* | 2/2010 | Chene ............... H04L 67/02 709/246 |
| 2012/0089610 A1 | 4/2012 | Agrawal et al. |
| 2014/0244623 A1 | 8/2014 | King |
| 2015/0134779 A1* | 5/2015 | Thompson ............ G06F 9/5088 709/219 |

(Continued)

OTHER PUBLICATIONS

"Actor model", Wikipedia, retrieved from https://en.wikipedia.org/wiki/Actor_model on Oct. 16, 2018, 18 pages.

(Continued)

*Primary Examiner* — Ann J Lo
*Assistant Examiner* — Fernando M Mari Valcarcel
(74) *Attorney, Agent, or Firm* — Foley & Lardner LLP

(57) ABSTRACT

A method for accessing information. A computer system receives a request for a piece of the information stored in a location between client computer systems and sources of the information. The information has formats for the information in the location. The formats for the information are controlled by the sources of the information. Each of the sources is assigned to control a group of portions of the information in the location. The computer system identifies the piece of the information corresponding to the request. The computer system returns a response to the request for the piece of the information, enabling simplifying access to the information in different formats.

20 Claims, 11 Drawing Sheets

(56) References Cited

U.S. PATENT DOCUMENTS

| | | | |
|---|---|---|---|
| 2015/0237121 A1* | 8/2015 | Nigam | H04L 67/1008 |
| | | | 709/204 |
| 2016/0371259 A1 | 12/2016 | Kohlmeier et al. | |
| 2018/0129721 A1* | 5/2018 | Apple | G06F 16/258 |
| 2018/0131788 A1* | 5/2018 | Roberts | H04L 67/131 |
| 2018/0165337 A1 | 6/2018 | Hopper | |
| 2018/0165604 A1 | 6/2018 | Minkin et al. | |
| 2018/0232262 A1* | 8/2018 | Chowdhury | G06F 9/541 |
| 2018/0232404 A1 | 8/2018 | Bhatti | |
| 2018/0262864 A1* | 9/2018 | Reynolds | G06F 16/254 |

OTHER PUBLICATIONS

"Akka (toolkit)", Wikipedia, retrieved from https://en.wikipedia.org/wiki/Akka_(toolkit) on Oct. 16, 2018, 4 pages.

US Office Action issued in corresponding U.S. Appl. No. 16/162,058, dated Dec. 17, 2021 (36 pages).

US Office Action issued in corresponding U.S. Appl. No. 16/162,058, dated Jul. 21, 2020 (29 pages).

US Office Action issued in corresponding U.S. Appl. No. 16/162,058, dated Jun. 14, 2022 (44 pages).

US Office Action issued in corresponding U.S. Appl. No. 16/162,058, dated Oct. 22, 2020 (31 pages).

US Office Action issued in corresponding U.S. Appl. No. 16/162,058, dated Sep. 20, 2022 (33 pages).

US Office Action issued in corresponding U.S. Appl. No. 16/162,058, dated Sep. 8, 2021 (34 pages).

\* cited by examiner

ACTOR-BASED INFORMATION SYSTEM

CROSS-REFERENCE TO RELATED APPLICATIONS

This application priority and benefit under 35 U.S.C. § 120 as a continuation of U.S. Ser. No. 16/162,058, filed Oct. 16, 2018, the contents of which are is hereby incorporated by reference herein in its entirety.

BACKGROUND INFORMATION

1. Field

The present disclosure relates generally to an improved computer system and, in particular, to a method and apparatus for accessing information. Still more particularly, the present disclosure relates to a method and apparatus for accessing information using an actor-based information system.

2. Background

Information systems are used for many different purposes. Many types of information may be located in the information systems for use by an organization.

For example, an information system may have information in the form of payroll information. This payroll information is used to process payroll to generate paychecks for employees in an organization.

Additionally, an information system also may include personnel information used by a human resources department to maintain benefits and other records about employees. For example, a human resources department may manage health insurance, wellness plans, and other programs and organizations using benefits information in the information system. As another example, this type of information may be used to determine when to hire new employees, assign employees to projects, perform reviews for employees, and other suitable operations for the organization.

Further, the information may come from many sources. The sources may be different departments, organizations, or other sources of the information. These sources may also be in different locations. The information from the different sources may be in information systems for the different sources.

Making information available for use by customers may be more difficult than desired. The information in the information systems may be in different formats. These formats may include, for example, the way the information is stored or the amount of information.

For example, payroll information may be received from different locations. These locations may send information for payroll information for states, regions, countries, or other locations.

Accessing the payroll information may be more difficult than desired for use in performing operations for an organization. For example, the payroll information may be formatted differently between some or all of the different locations. Different amounts of information may also be present.

For example, payroll information from a first state that has an income tax may include information about state income taxes. Payroll information from a second state that does not have state taxes does not include this information. The number of fields may be different since the first payroll information from one state includes state tax income information and the second payroll information from the other state does not include state income tax information.

As another example, the information received from two states may be the same type of information. The formatting of the information, however, may be different. For example, a currency symbol may be placed before or after the value. Further, the value may or may not have decimal places. As another example, the names of the fields may be different.

Also, in addition to formatting, the type of currency may be different for different locations. Payroll information from locations in the United States is in dollars, while payroll information from the United Kingdom is in pounds. Payroll information from Germany is in Euros.

With this situation, the information from the two states may be more difficult for the consumer to use than desired. For example, the consumer may wish to aggregate the payroll information from the first state and the second state.

The consumer often changes the format of the payroll information from the format as received into one useable by the consumer. For example, when multiple formats for payroll information are present, these formats are converted such that all of the payroll information has the same format. A consumer accessing this payroll information may find this process more difficult than desired.

Therefore, it would be desirable to have a method and apparatus that take into account at least some of the issues discussed above, as well as other possible issues. For example, it would be desirable to have a method and apparatus that overcome the technical problem of information having different formats in an information system.

SUMMARY

An embodiment of the present disclosure provides a method for accessing information over an actor-based integration system. The actor-based integration system receives a request from an application for a piece of the information stored in a location between the application and organizations assigned to control a group of portions of the information in the location. The information has formats for the information in the location. The actor-based integration system identifies the piece of the information in the location corresponding to the request. The actor-based integration system transforms the piece of information from a first format that is used to store the information in the location into a second format usable by the requesting application. The actor-based integration system returns a response to requesting application that includes the transformed information.

Another embodiment of the present disclosure provides a computer system comprising a hardware processor and an actor-based integration system in communication with the hardware processor. The actor-based integration system receives a request from an application for a piece of the information stored in a location between the application and organizations assigned to control a group of portions of the information in the location. The information has formats for the information in the location. The actor-based integration system identifies the piece of the information in the location corresponding to the request. The actor-based integration system transforms the piece of information from a first format that is used to store the information in the location into a second format usable by the requesting application. The actor-based integration system returns a response to requesting application that includes the transformed information.

Yet another embodiment of the present disclosure provides a computer program product for accessing information over an actor-based integration system. The computer program product comprises a non-transitory computer readable storage media and program code stored on the computer readable storage media. The program code includes code for receiving a request from an application for a piece of the information stored in a location between the application and organizations assigned to control a group of portions of the information in the location. The information has formats for the information in the location. The program code includes code for identifying the piece of the information in the location corresponding to the request. The program code includes code for transforming the piece of information from a first format that is used to store the information in the location into a second format usable by the requesting application. The actor-based integration system returns a response to requesting application that includes the transformed information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that reducing a number of formats for a particular type of information may result in easier access and processing of information by a consumer. The illustrative embodiments also recognize and take into account that a reduction in the number of formats may occur through reducing a number of parties that control formats for a particular type of information that may be accessed by a consumer. A consumer is a person, organization, or entity that may access information using computers or other data processing devices.

Figure 1:
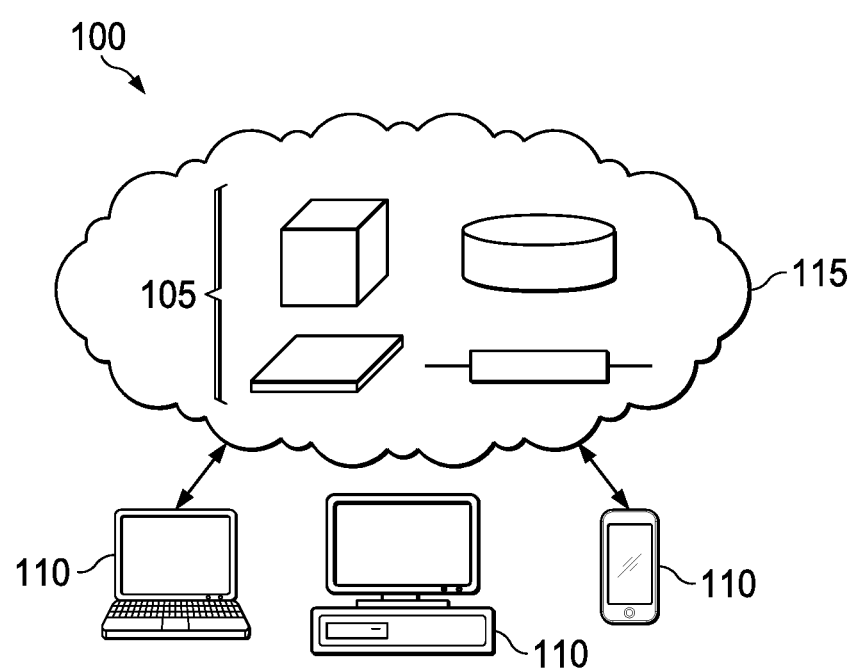
FIG. 1 is a block diagram of a cloud environment in accordance with an illustrative embodiment.

FIG. 1 is a block diagram of a cloud environment depicted in accordance with an illustrative embodiment. FIG. 1 shows an exemplary cloud computing environment 100. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with a service provider. In embodiments, one or more aspects, functions, and/or processes described herein may be performed and/or provided via cloud computing environment 100.

As depicted in FIG. 1, cloud computing environment 100 includes cloud resources 105 that are made available to client devices 110 via network 115, such as the Internet. Cloud resources 105 can include a variety of hardware and/or software computing resources, such as servers, databases, storage, networks, applications, and platforms. In embodiments, the systems and processes herein can be integrated into the cloud resources in order to provide tracking and trending capabilities as described and shown herein.

Cloud resources 105 may be on a single network or a distributed network. Cloud resources 105 may be distributed across multiple cloud computing systems and/or individual network enabled computing devices. Client devices 110 may comprise any suitable type of network-enabled computing device, such as servers, desktop computers, laptop computers, handheld computers (e.g., smartphones, tablet computers), set top boxes, and network-enabled hard drives. Cloud resources 105 are typically provided and maintained by a service provider so that a client does not need to maintain resources on a local implementation of client devices 110. In embodiments, cloud resources 105 may include one or more computing system 1300 of FIG. 13 that is specifically adapted to perform one or more of the functions and/or processes described herein.

Cloud computing environment 100 may be configured such that cloud resources 105 provide computing resources to client devices 110 through a variety of service models, such as Software as a Service (SaaS), Platforms as a service (PaaS), Infrastructure as a Service (IaaS), and/or any other cloud service models. Cloud resources 105 may be configured, in some cases, to provide multiple service models to client devices 110. For example, cloud resources 105 can provide both SaaS and IaaS to client devices 110. Cloud resources 105 may be configured, in some cases, to provide different service models to different types of client devices 110. For example, cloud resources 105 can provide SaaS to a first type of client devices 110 and PaaS to a second type of client devices 110.

Cloud computing environment 100 may be configured such that cloud resources 105 provide computing resources to client devices 110 through a variety of deployment models, such as public, private, community, hybrid, and/or any other cloud deployment model. Cloud resources 105 may be configured, in some cases, to support multiple deployment models. For example, cloud resources 105 can provide one set of computing resources through a public deployment model and another set of computing resources through a private deployment model.

One or more of cloud resources 105 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and may provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources in cloud resources 105 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions, and/or processes described herein may be accessed and/or utilized by a client (e.g., an enterprise or an end user) as one or more of a SaaS, PaaS, and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 105 may be configured to provide a variety of functionality that involves user interaction. Accordingly, a user interface (UI) can be provided for communicating with cloud resources 105 and/or performing tasks associated with cloud resources 105. The UI can be accessed via client devices 110 in communication with cloud resources 105. The UI can be configured to operate in a variety of client modes, including a fat client mode, a thin client mode, or a hybrid client mode, depending on the storage and processing capabilities of cloud resources 105 and/or client devices 110. Therefore, a UI can be implemented as a standalone application operating at the client device in some embodiments. In other embodiments, a web browser-based portal can be used to provide the UI. Any other configuration to access cloud resources 105 can also be used in various implementations.

Figure 2:
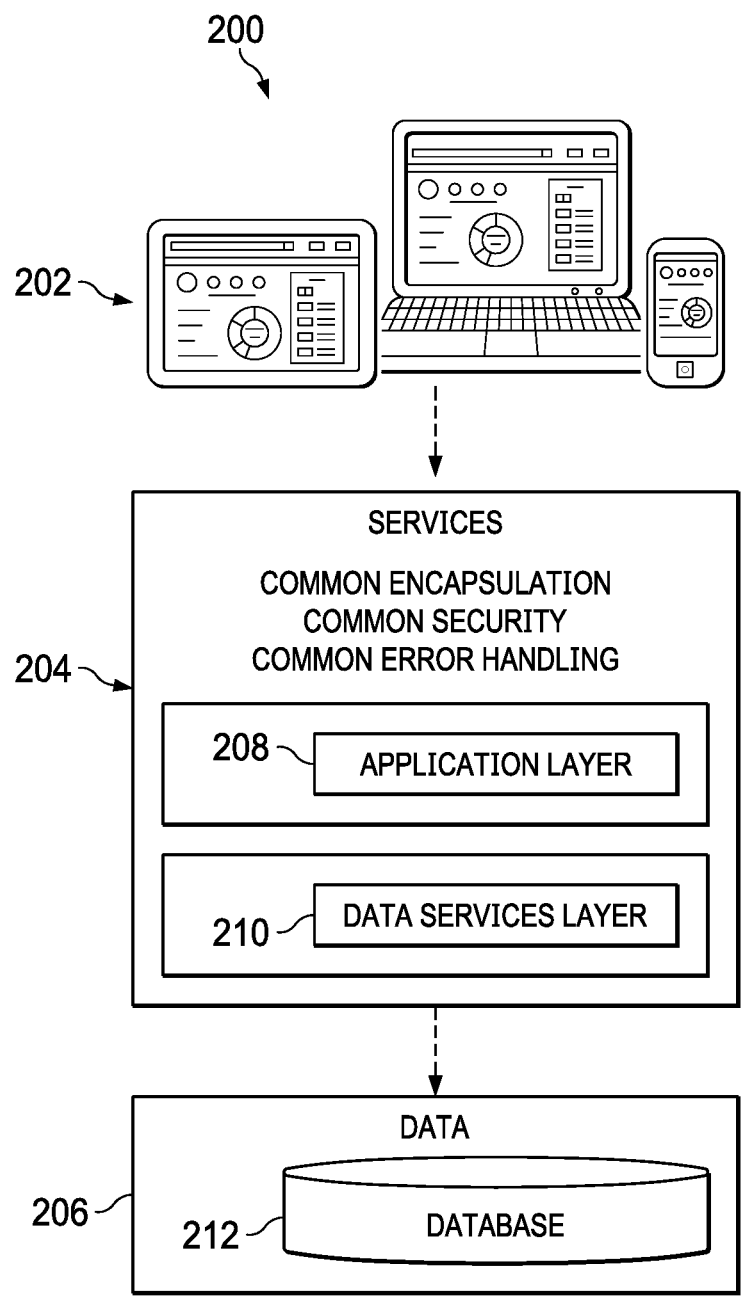
FIG. 2 is a block diagram of an architecture of an information system in accordance with an illustrative embodiment.

FIG. 2 is a block diagram of an architecture of an information system depicted in accordance with an illustrative embodiment. Information system architecture 200 may be implemented in the context of a network or cloud operating environment such as cloud computing environment 100 of FIG. 1.

Information system architecture 200 includes client layer 202, services layer 204, and data layer 206. Each of client layer 202, services layer 204, and data layer 206 may be implemented as described above for tracking information system architecture 200. Each layer communicates only with the immediately preceding and immediately succeeding layer, although in some illustrative embodiments, a client in client layer 202 may communicate directly with servers or non-transitory computer-readable storage media in data layer 206.

Client layer 202 includes one or more client systems. A client system may be a computer, an application, or a third party request through some other computer. Thus, a client system may be a requesting computer or program communicating through a cloud environment. Client layer 202 communicates through one or more communication channels with services layer 204.

Services layer 204 provides for common encapsulation, common security, and common error handling with respect to requests and data reception from client layer 202. Services layer 204 may include application layer 208 and data services layer 210. Details regarding services layer 204, application layer 208, and data services layer 210 are described with respect to FIG. 3. However, in general, application layer 208 handles requests for applications, and data services layer 210 handles application programming interfaces for building requests to data layer 206.

Data layer 206, in turn, includes one or more databases, such as database 212. One or more of these databases may be stored on an individual non-transitory computer-readable storage medium. These databases may contain the underlying information which is consumed and then returned to the clients in client layer 202. Thus, information system architecture 200 is a service-oriented architecture which is highly scalable and which provides multi-device support.

Figure 3:
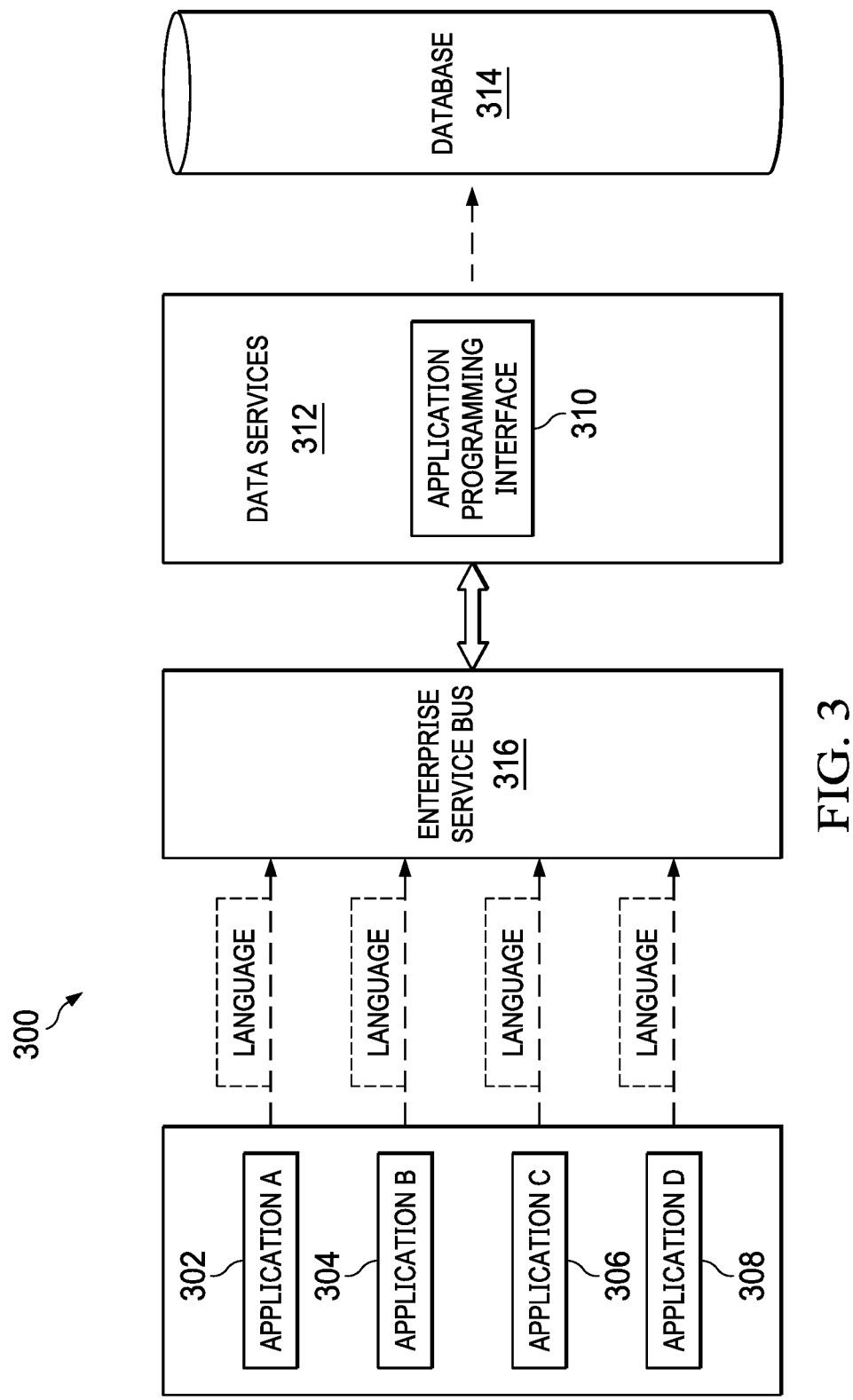
FIG. 3 is a block diagram of details of the architecture of the information system of FIG. 2 in accordance with an illustrative embodiment.

FIG. 3 is a block diagram illustrating details of information system architecture 200 shown in FIG. 2 depicted in accordance with an illustrative embodiment. Specifically, services layer 300 is an example of services layer 204 of FIG. 2.

In an illustrative embodiment, data requests (either from a push or a pull) are transmitted back and forth from applications, such as application A 302, application B 304, application C 306, and application D 308. These requests are then received by one or more application programming interfaces (APIs), such as application programming interface 310 within data services 312, to build a request of database 314 (which may be in data layer 206 of FIG. 2). These application programming interfaces may be built using one or more languages, depending on the author of the corresponding application. In an illustrative embodiment, one or more of application A 302, application B 304, application C 306, and application D 308 are web services.

The World Wide Web Consortium (W3C), which is the main international standards organization for the World Wide Web, has defined a "web service" as a software system designed to support interoperable machine-to-machine interaction over a network. That is, web services may refer to web-based applications that interact with other web-based applications in order to provide a desired service. For example, application software for running employee payroll on one computer may send messages via the Internet to a timekeeping server in order to retrieve employee hours and hourly rates. The application software may then process the retrieved information within the payroll application. Other examples of common web services include banking, currency converters, airplane flight schedule lookups, auction services, and language translation services.

In a service-oriented architecture providing web services, an enterprise service bus is a distributed software architecture implemented from a collection of middleware services which provides integration capabilities over a network. Middleware is a family of computer software that permits the interconnection, usually over a network, of disparate software components or applications possibly running across heterogeneous computing platforms. A middleware is often used to support complex distributed applications such as web servers, application servers, content management systems, and more generally to support all the software products and tools part of the information technology (IT) system of any modern large enterprise, company, and organization. Use of a middleware is also recognized as a solution to the problem of linking new applications to older legacy systems.

Enterprise service bus 316 acts as an intermediary between disparate application A 302, application B 304, application C 306, and application D 308, enabling the applications to communicate and send data back and forth to each other. For example, a first application that requests a service may be referred to as the source application, and a second application that provides the requested service may be referred to as the provider application. The request from the source application may be received by enterprise service bus 316, which allows the applications to communicate by transforming and routing messages between the applications. Enterprise service bus 316 may replace all direct contact with the applications on the bus, so that all communication among applications takes place via the bus. For instance, when the enterprise service bus receives a service request message from one application, it routes the message to the appropriate provider application.

Enterprise service bus 316 may also convert the service request message, as the provider application may utilize different messaging formats and communication protocols from the source application. For example, the message may be converted from a Simple Object Access Protocol (SOAP) format over HyperText Transfer Protocol (HTTP) protocol to the SOAP format over Message Queue (MQ) protocol in order for the provider application to receive and service the request if the formal messaging protocol of the provider application is MQ instead of HTTP. The message may also be converted from the application format of the source application to a messaging format capable of being interpreted by the provider application.

Figure 4:
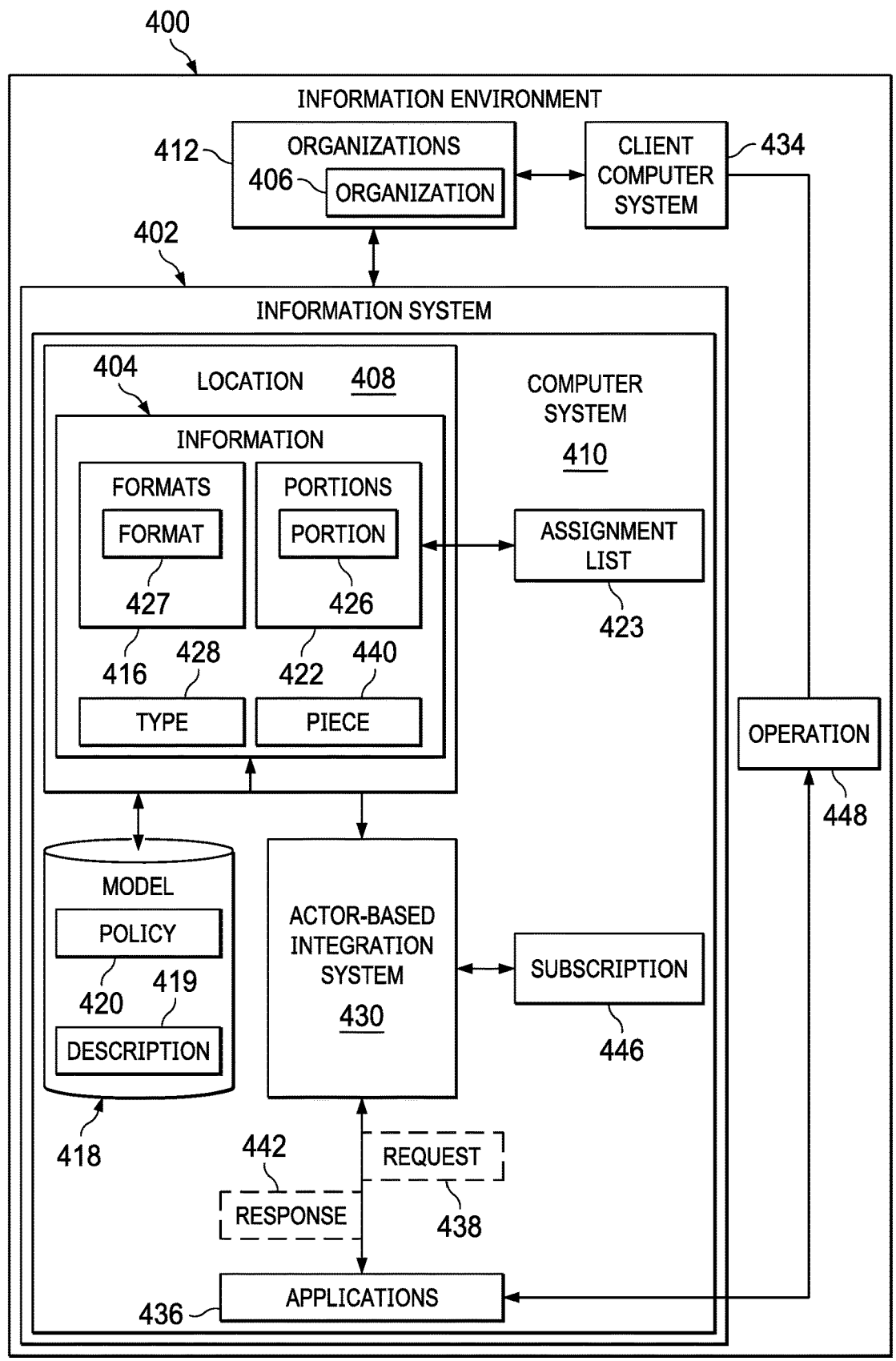
FIG. 4 is a block diagram of an information environment in accordance with an illustrative embodiment.

With reference now to FIG. 4, a block diagram of an information environment is depicted in accordance with an illustrative embodiment. In this illustrative example, information environment 400 includes information system 402. Information system 402 manages information 404 about organization 406.

As depicted, information system 402 is used to manage information 404. This management of information 404 may include at least one of writing, modifying, deleting, distributing, partitioning, sharing, assigning ownership, accessing, or otherwise manipulating information 404.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, organization 406 may take various forms. For example, organization 406 may be a company, a charity, an educational group, a social group, a team, a government entity, a group of businesses, or some other suitable organization.

As depicted, information 404 is stored in location 408 in computer system 410. Computer system 410 is a hardware system that includes one or more data processing systems. In this illustrative example, information 404 is stored in one or more data processing systems in location 408 in computer system 410.

When more than one data processing system is present in computer system 410, those data processing systems may be in communication with each other using a communications medium. The communications medium may be a network. The data processing systems may be in more than one location. The data processing systems may be selected from at least one of a computer, a server computer, or some other suitable data processing system for storing information 404 in location 408. Location 408 may be at least one of a computer, a storage system, a hard disk drive system, or some other part of computer system 410 that may store information 404. For example, location 408 may be database 314 of FIG. 3. Location 408 may function as a hub for receiving and distributing information 404.

In this illustrative example, information 404 is received from a group of organizations 412. "A group of," as used herein, when used with reference to items, means one or more items. For example, "a group of organizations" is one or more organizations.

As depicted, organizations 412 send information 404 to location 408 in computer system 410. In this illustrative example, information 404 has formats 416. A format is the manner in which information 404 is organized. For example, a format for information 404 may include at least one of a file format for encoding information for storage in a computer file, an audio format, a video format, a data type, a primitive type, a numeric type, a type of data structure, a structure for a record, a structure for a table, a name of a field in a data structure, a type of encryption, a message format, a date format, a type of currency, a font type, a font size, a language, or other suitable formats that may be used to organize information 404.

In this illustrative example, model 418 is a description of entities and relationships between the entities that make up organization 406. As depicted, description 419 in model 418 describes formats 416 for information 404 in location 408. Additionally, model 418 includes policy 420. Policy 420 is a group of rules and also may include information used to apply the group of rules.

In this illustrative example, policy 420 describes how organizations 412 may be assigned to a group of portions 422 of information 404. For example, each of organizations 412 is assigned to control a group of portions 422 of information 404 based on policy 420 in model 418. Furthermore, different departments in organization 406 may be assigned to control a group of portions 422 of information 404 based on policy 420 in model 418.

As depicted, assignment list 423 identifies which ones of organizations 412 are assigned to particular ones of portions 422. Assignment list 423 is generated when policy 420 is applied to identify the assignment of sources 412 to portions 422.

In the illustrative example, organization 406 is assigned to control portion 426 in portions 422. In other words, organization 406 controls information 404 in portion 426. As depicted, organization 406 decides what information is present in portion 426, format 427 in formats 416 used for information 404 in portion 426, the size of portion 426, when information 404 in portion 426 is updated, and other suitable parameters with respect to portion 426.

Information 404 is information about organizations 412. Information 404 may include, for example, at least one of information about people, products, research, product analysis, business plans, financials, or other information relating to organizations 412.

Portion 426 of information 404 can be human resources information. As used herein, human resources information is information used to perform human resources operations for employees of organizations 412. For example, portion 426 that is human resources information may include data that is used to process payroll to generate paychecks for employees of organizations 412. Additionally, portion 426 that is human resources information may include data that is used by human resources departments of organizations 412 to maintain benefits and other records about employees of organizations 412.

In this illustrative example, information 404 present in portion 426 is based on type 428 of information 404. For example, all of information 404 in portion 426 may be information 404 about benefits. Benefits are ones of type 428 of information 404.

Type 428 of information 404 may take different forms. For example, type 428 of information 404 is selected from one of accounting, research, business planning, accounts receivable, accounts payable, sales, marketing, payroll, benefits, taxes, education, or other suitable classifications for information 404. As depicted, information 404 in location 408 is managed by actor-based integration system 430.

Actor-based integration system 430 is not an enterprise service bus. The enterprise service bus is heavy, providing protocol agnistic integration, connectors, transformations, and orchestrations. In contrast to enterprise service bus 312 of FIG. 3, actor-based integration system 430 is a lightweight integration system that runs, for example, on a Java virtual machine (JVM) container. Actor-based integration system 430 utilizes business logic and complex calculations to aggregate, enrich, and transform data from one format to another format.

Actor-based integration system 430 implements its functions using an actor model programming paradigm that expresses the behavior of an application using actor modules. The actor modules perform defined processing tasks during runtime, and capture their respective local states. The actor modules are isolated and independent entities that do not share memory. The actor modules cooperate via the asynchronous exchange of messages, that are the sole mechanism for inter-actor communication. The actor modules are decoupled from the message source; the only responsibility of the actor modules is to properly recognize the type of message received and, in response, take an appropriate action.

In this example, actor-based integration system 430 may be implemented in software, hardware, firmware, or a combination thereof. When software is used, the operations performed by actor-based integration system 430 may be implemented in program code configured to run on hardware, such as a processor unit. When firmware is used, the operations performed by actor-based integration system 430 may be implemented in program code and data and stored in persistent memory to run on a processor unit. When hardware is employed, the hardware may include circuits that operate to perform the operations in actor-based integration system 430.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, in managing information 404 in location 408, actor-based integration system 430 may perform various functions to manage information 404. For example, actor-based integration system 430 receives information 404 from organizations 412. In particular, actor-based integration system 430 may receive information 404 from organizations 412 for storage at location 408 and distribution to applications 436. Information 404 may be received from organizations 412 in formats 416 as described by model 418.

Actor-based integration system 430 places information 404 into location 408. Information 404 may be accessed or distributed to applications 436 to perform operation 448.

Additionally, actor-based integration system 430 also facilitates the control of information 404 by organizations 412. For example, actor-based integration system 430 may determine which ones of organizations 412 may make changes to different ones of portions 422 of information 404. Actor-based integration system 430 may determine whether source 424 is allowed to change information 404 in portion 426 when source 424 sends a request to change information 404 in portion 426. This determination is made using assignment list 423, generated using policy 420.

Furthermore, actor-based integration system 430 also functions to distribute information 404 as part of managing information 404. In this illustrative example, actor-based integration system 430 may distribute information 404 to applications 436.

Applications 436 are applications such as one or more of application A 302, application B 304, application C 306, and application D 308 of FIG. 3. In this depicted example, applications 436 access information 404 when performing operation 448 for organizations 412.

For example, actor-based integration system 430 may receive request 438 from applications 436. Request 438 can be a request for piece 440 of information 404.

Actor-based integration system 430 identifies piece 440 of information 404 that corresponds to request 438 from applications 436. Actor-based integration system 430 returns response 442 to request 438 for information 404 to applications 436. In this manner, actor-based integration system 430 accelerates both access to information 404 and the performance of operation 448.

In this illustrative example, actor-based integration system 430 is aware of formats 416 for portions 422 of information 404. For example, actor-based integration system 430 may access model 418 and receive description 419 for formats 416. Actor-based integration system 430 may request description 419 in model 418 when accessing information 104 for applications 436.

Thus, the technical problem of accessing information 404 having different formats when performing operation 448 in information system 402 is solved through one or more technical solutions in the illustrative examples. In one illustrative example, a technical solution is present in which actor-based integration system 430 accesses and processes information 104 requested by applications 436 in the performance of operation 448. In the depicted example, each portion in portions 422 is controlled by an organization in organizations 412. Further, each portion has a type of information 404. As a result, when client computer system 434 requests a particular type of information 404 in portion 426, actor-based integration system 430 transforms information 404 into formats 416 expected by applications 436.

In this manner, operation 448 may be performed. Operation 448 may be performed by client computer system 434, organization 406, organizations 414, or some other suitable type of entity. Thus, portion 426 in portions 422 of information 404 is type 428 of information 404 that may be used to perform operation 448 for organization 406. As depicted, operation 448 may be, for example, hiring, benefits administration, research, forming a team, performing performance evaluations, manufacturing a product, or some other suitable type of operation.

The organization controls a format or formats used in the portion assigned to the organization. As a result, a technical effect in which a reduced number of formats 416 is present for each of portions 422 occurs through reducing the number of organizations 412 that control formats 416 for each of portions 422. By having organization 406 control portion 426 of information 404, uniformity in formats 416 for portion 426 of information 404 may be achieved.

As a result, computer system 410 operates as a special purpose computer system in which actor-based integration system 430 in computer system 410 enables easier access to information 404 by applications 436 and accelerated performance of operations 448. The easier access occurs in one illustrative example through assigning control of portions 422 of information 404 to particular ones of organizations 412. This improved performance is enabled by the actor. In particular, actor-based integration system 430 transforms computer system 410 into a special purpose computer system as compared to currently available general computer systems that do not have actor-based integration system 430.

Computer system 410 in location 408 performs a transformation of information 404. For example, computer system 410 aggregates information 404 from organizations 412 into location 408. In this example, actor-based integration system 430 enables applications 436 to access information 404 from location 408 more quickly when performing operation 448.

Figure 5:
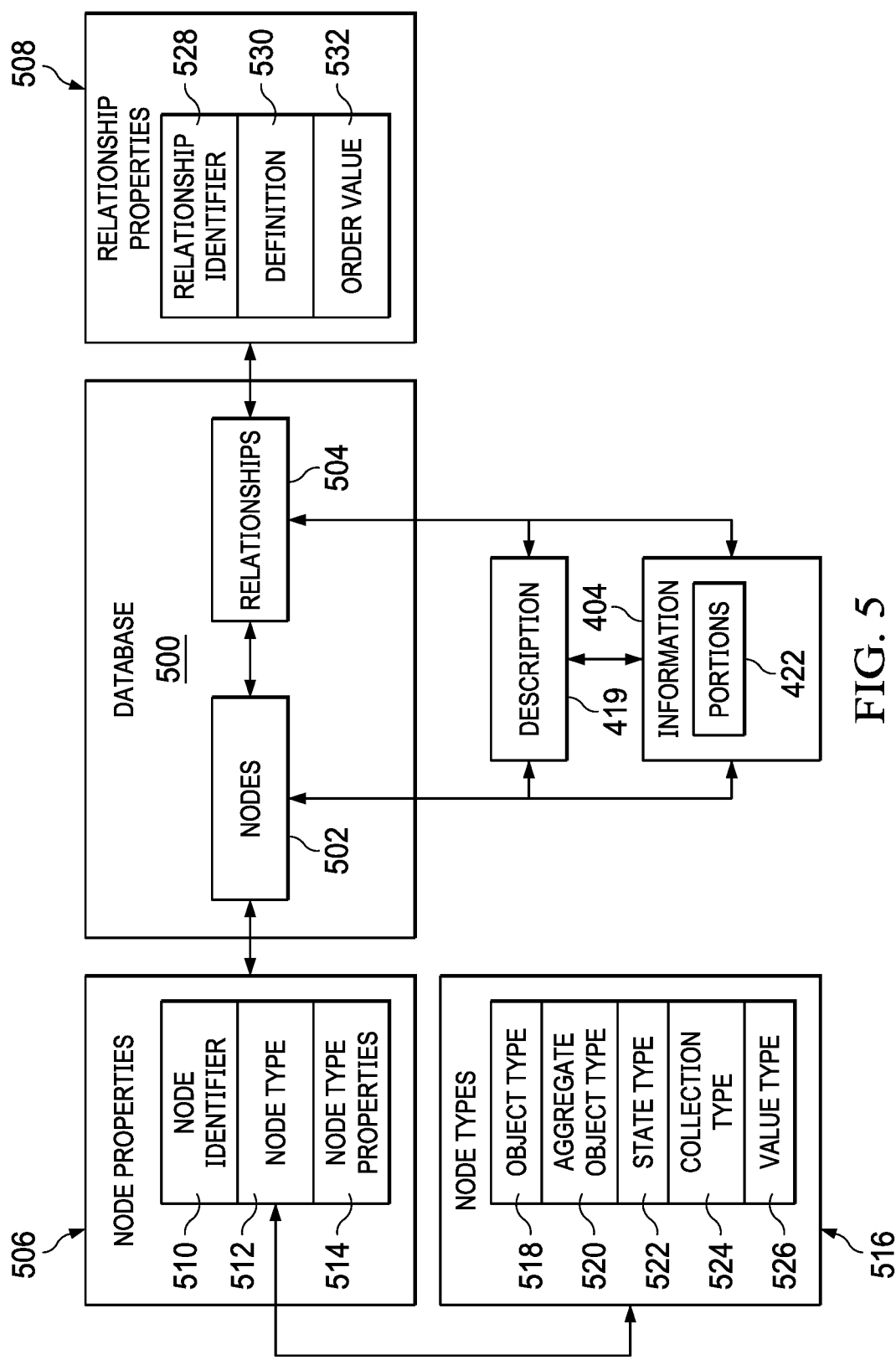
FIG. 5 is a block diagram of a database in accordance with an illustrative embodiment.

With reference to FIG. 5, a block diagram of a database is depicted in accordance with an illustrative embodiment. In this illustration, database 500 is an example of a data structure that may be used in location 408 in FIG. 4. Database 500 may store information 404.

As depicted, database 500 includes nodes 502 and relationships 504. In this illustrative example, nodes 502 indicate description 419 of formats 416 in FIG. 4 for portions 422 of information 404. Nodes 502 also indicate values for portions 422 of information 404. Nodes 502 may represent at least one of accounting, research, business planning, accounts receivable, accounts payable, sales, marketing, payroll, benefits, taxes, education, or other suitable classifications for information 404. As depicted, relationships 504 indicate the relationship between nodes 502.

In this illustrative example, nodes 502 have node properties 506. Additionally, relationships 504 have relationship properties 508.

As depicted, node properties 506 are the properties of nodes 502. These properties of nodes 502 identify description 419 of formats 416 for portions 422 of information 404. These properties also identify values for portions 422 of information 404. In this illustrative example, node properties 506 include node identifier 510, node type 512, and node type properties 514.

Node identifier 510 points to the node in which node identifier 510 is located. For example, node identifier 510 may be alpha numeric text that identifies the node in database 500.

Node type 512 indicates the type of the node in which node type 512 is located. Node type 512 also indicates the type of properties in node type properties 514.

In this illustrative example, node type 512 is selected from at least one of node types 516 or some other suitable type for representing portions 422 of information 404 as nodes 502 in database 500. As depicted, node types 516 include object type 518, aggregate object type 520, state type 522, collection type 524, and value type 526.

State type 522 is the node type of a node in nodes 502 for a state. The state is a group of named values for a portion of information 404.

Object type 518 is the node type of a node in nodes 502 for an object. An object is a data structure that contains data. The data is a portion of information 404. For example, when the portion of information 404 includes a name formed by a first name and a last name, the name is an object with the first name and the last name.

As another illustrative example, when the portion of information 404 includes a customer list with names and contact information, the customer list is an object that includes a list of names and contact information. In this example, the contact information may also be an object.

Aggregate object type 520 is an example of node types 516 used for an aggregate object. An aggregate object is an object with a key. The key in an aggregate object is a pointer to the aggregate object for a portion of information 404. The key is used to access the portion through a client interface accessing subscription 446.

Collection type 524 is an example of node types 516. In this illustrative example, collection type 524 is used for a collection. A collection is a sequence of portions of information 404. The sequence includes at least one of objects, collections, or values.

Value type 526 is an example of node types 516 for a value. This value is a value in a portion of information 404.

Node type properties 514 indicate at least one of the format or the values of portions 422 of information 404. Node type properties 514 include at least one of attributes, values, references, or other suitable types of properties. For example, a node type property for a node may be at least one of an attribute of the node, a value for the node, or a reference pointing to the node.

In the illustrated example, relationship properties 508 are the properties of relationships 504. These properties are the properties of the relationship between two nodes. As depicted, relationship properties 508 include relationship identifier 528, definition 530, and order value 532.

Relationship identifier 528 points to the relationship in which relationship identifier 528 is located. For example, relationship identifier 528 may be alpha numeric text that identifies the relationship in database 500.

As depicted, definition 530 defines the relationship between two nodes. Definition 530 includes pointers to the two nodes. Definition 530 indicates the two nodes are related to each other.

For example, when the first of the two nodes is an object, definition 530 defines a relationship between the object and at least one of another object, a state of the object, a collection of the object, or a value of the object. As another example, when the first node of the two nodes is a collection, definition 530 defines a relationship between the collection and at least one of another collection in the collection, an object in the collection, a group of states in the collection, or a value in the collection.

In this illustrative example, order value 532 is a value specifying relative order of a relationship in a sequence of relationships. For example, the value may be at least one of a number, an alphanumeric sequence of characters, or some other suitable value that indicates order in a sequence of relationships.

Figure 6:
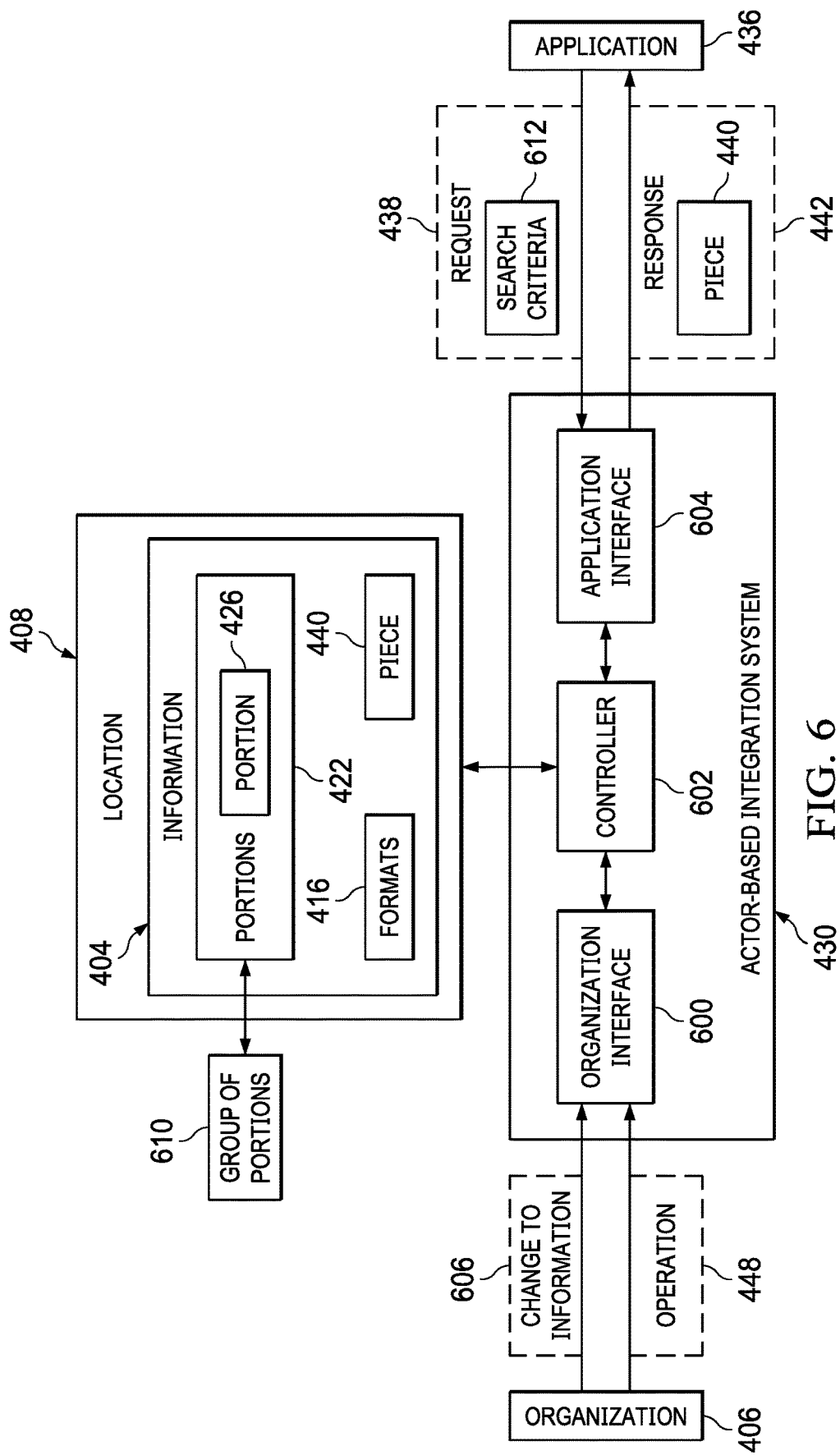
FIG. 6 is a block diagram of a data flow for accessing information in accordance with an illustrative embodiment.

With reference next to FIG. 6, an illustration of a block diagram of data flow for accessing information is depicted in accordance with an illustrative embodiment. In this figure, an example of data flow for a process for accessing piece 440 of information 404 through actor-based integration system 430 is shown. In the illustrative examples, the same reference numeral may be used in more than one figure. This reuse of a reference numeral in different figures represents the same element in the different figures.

In this illustrative example, actor-based integration system 430 has a number of different components. As depicted, actor-based integration system 430 includes organization interface 600, controller 602, and application interface 604. In this illustrative example, each of organization interface 600 and application interface 604 is at least one of web services, representational state transfer services, durable queues, or some other suitable type of service interface. In this illustrative example, one or more of organization interface 600 and application interface 604 is implemented using an actor model programming paradigm.

In this illustrative example, controller 602 receives change to information 608 for group of portions 610 in portions 422 or change to information 608 for group of portions 610. Change to information 608 can be at least one of information for group of portions 610, an addition of additional information for group of portions 610, a modification of information 404 in group of portions 610, or a deletion of information 404 from group of portions 610. Change to information 608 can be at least one of an additional format in formats 416 for group of portions 610, modifications to a format in formats 416 for group of portions 610, or a removal of a format in formats 416 for group of portions 610.

As depicted, controller 602 receives request 438 through application interface 604. In this illustrative example, request 438 includes search criteria 612. Search criteria 612 indicates a group of portions 610 of information 404. As depicted, search criteria 612 may be in the form of a query. For example, the query may be defined using a query by example (QBE) standard.

In one illustrative example, search criteria 612 includes a group of boolean expressions that test for values in the group of portions 610 of information 404. The group of boolean expressions can include at least one of a wild card or text. A wild card indicates matching text is variable for the portion indicated by the wild card. Wild cards in search criteria 612 are selected from at least one of "*", "?", or other suitable types of wild cards.

For example, search criteria 612 may include a boolean expression indicating the name value pair "employee": "*Smith." In this example, search criteria 612 is a request for portions 422 of information 404 indicated by a name value pair with the name "employee" and a value that matches any text that ends with "Smith." For example, when a value for a named value pair with the name "employee" in a portion of the information includes the value "Tom Smith," the portion indicates a match for search criteria 612.

Controller 602 identifies piece 440 of information 404 in location 408 based on search criteria 612. In this illustrative example, location 408 in computer system 410 may organize information 404 in a number of different ways. For example, at least one of a graph database, a relational database, a file system, or some other suitable type of mechanism for organizing information 404 may be used.

Controller 602 then generates response 442. In this illustrative example, controller 602 includes piece 440 in response 442. Controller 602 then sends response 442 to application 436 through application interface 604.

In this illustrative example, application interface 604 uses a plurality of actor modules that implement an actor model programming paradigm to transform piece 440 of information 404. Application interface 604 transforms piece 440 of information 404 from a first one of formats 416 that is used to store information 404 in location 408. Application interface 604 transforms piece 440 of information 404 into a second one of formats 416 that is used by application 436 to perform operation 448.

Figure 7:
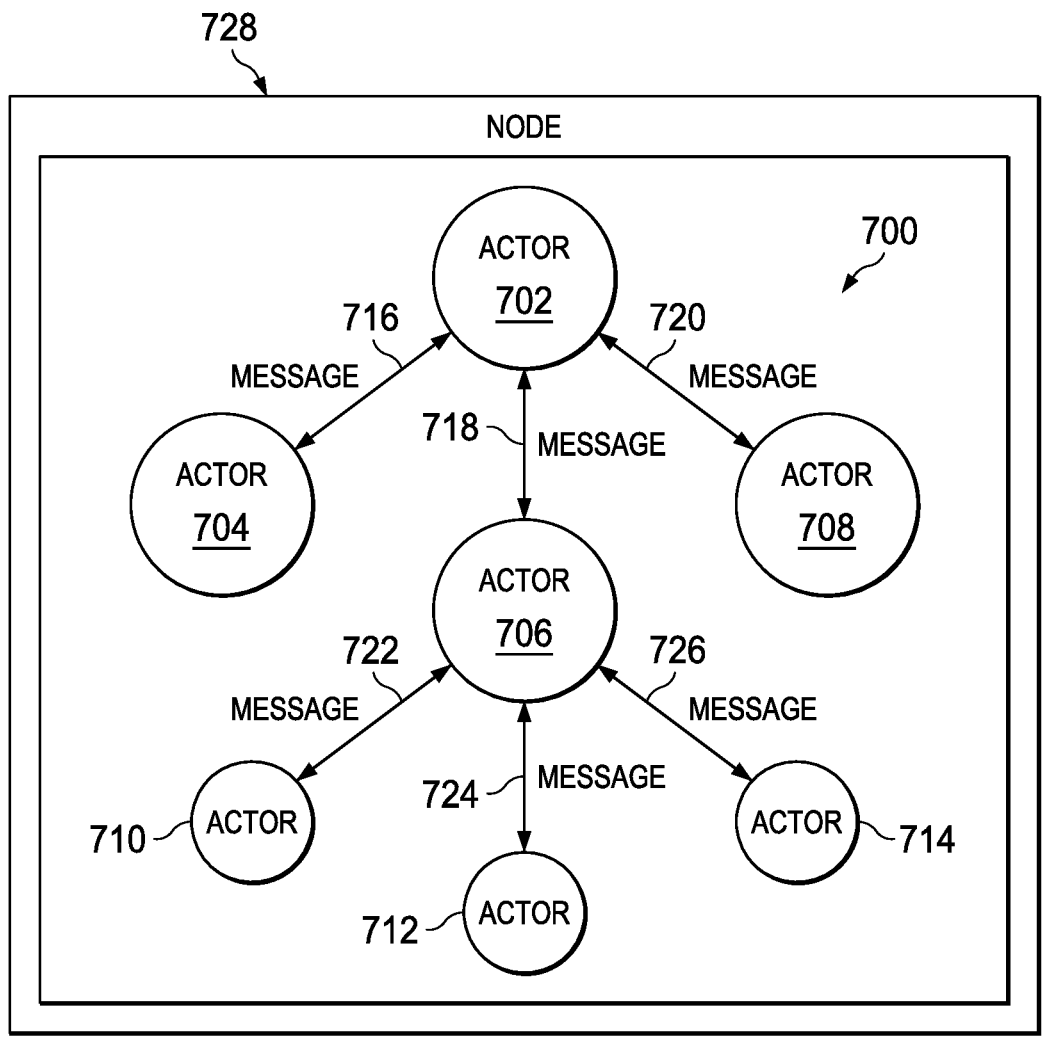
FIG. 7 is a block diagram of an actor system in accordance with an illustrative embodiment.

Referring now to FIG. 7, a block diagram of an actor system is depicted in accordance with to an illustrative embodiment. Actor system 700 can be used to implement actor-based integration system 430 of FIG. 4.

Actor system 700 is a group of actors logically organized log into a hierarchical structure. Actor system 700 provides the infrastructure through which actors 702-714 interact with one another. Each of actors 702-714 are objects which encapsulate state and behavior of the actor.

Instead of calling methods, actors 702-714 communicate exclusively by the asynchronous change of messages 716-726. Actors execute independently from the senders of a message, and they react to incoming messages sequentially, one at a time. Sending a message does not transfer the thread of execution from the sender to the destination. An actor can send a message and continue without blocking. Therefore, different actors work concurrently with each other so that an actor system can process as many messages simultaneously as the hardware will support.

Tasks performed by actor system 700 are split up and delegated until they become small enough to be handled in one piece. For this purpose, an actor, which is to oversee a certain function in the program might want to split up its task into smaller, more manageable pieces. An actor, such as actor 702, starts and supervises child actors, such as actors 704-708, naturally creating the hierarchical structure of actor system 700.

In this illustrative example, actor system 700 is implemented in node 728. Node 728 provides a runtime environment, including one or more virtual machines, on which actor system 700 is implemented.

Figure 8:
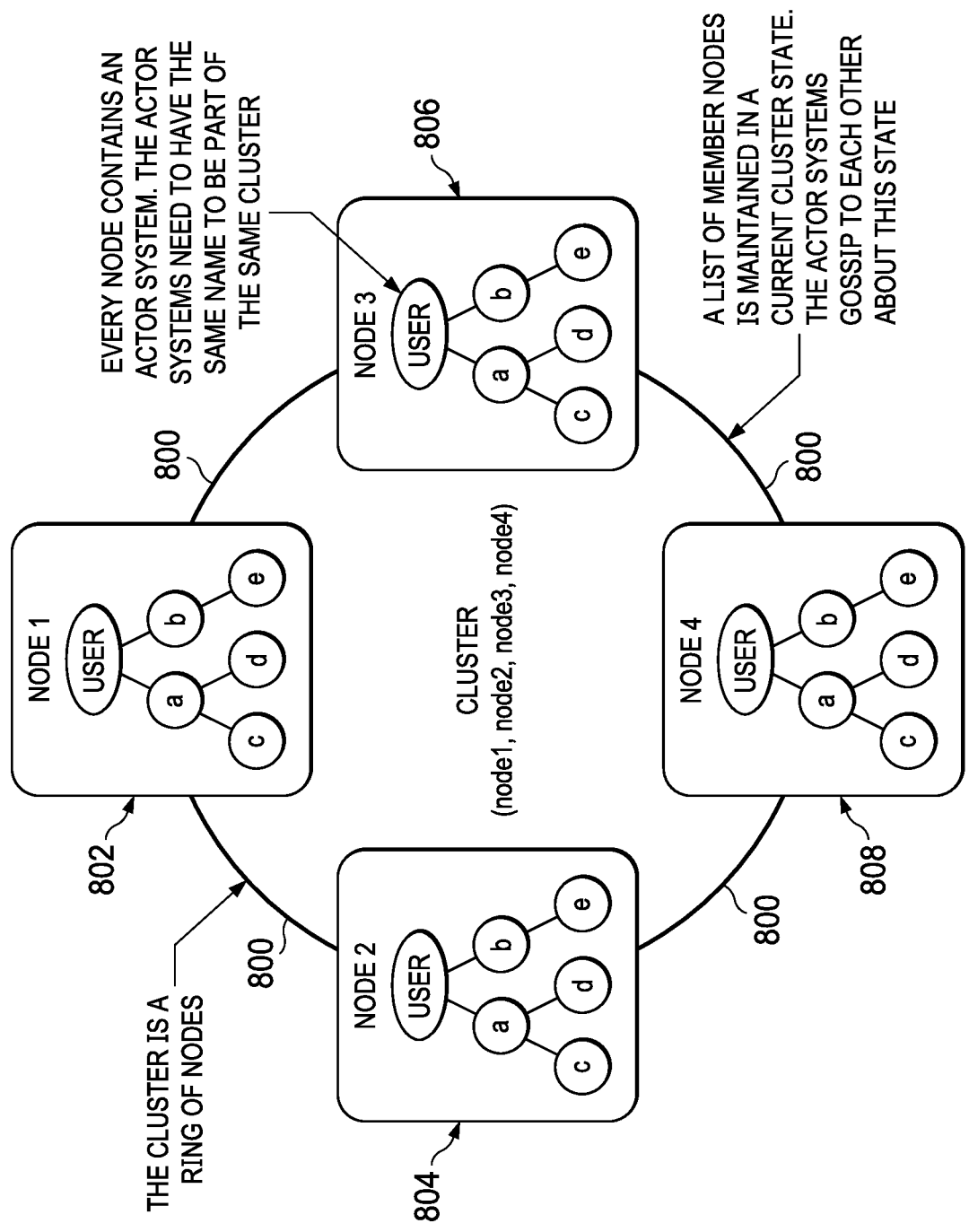
FIG. 8 is a block diagram of a cluster of an actor system in accordance with an illustrative embodiment.

With reference now to FIG. 8, a block diagram of a cluster of actor systems is depicted in accordance with an illustrative example. Cluster 800 is a dynamic group of nodes, such as node 728 of FIG. 7. Each of nodes 802, 804, 806, and 808 is an actor system that listens on the network, and provides automated features for actor distribution, load balancing, and failover.

Nodes 802, 804, 806, and 808 can be added to or removed from cluster 800 when more or less processing power is required. Cluster 800 therefore allows applications to scale dynamically in real-time based on current processing requirements of an application.

Figure 9:
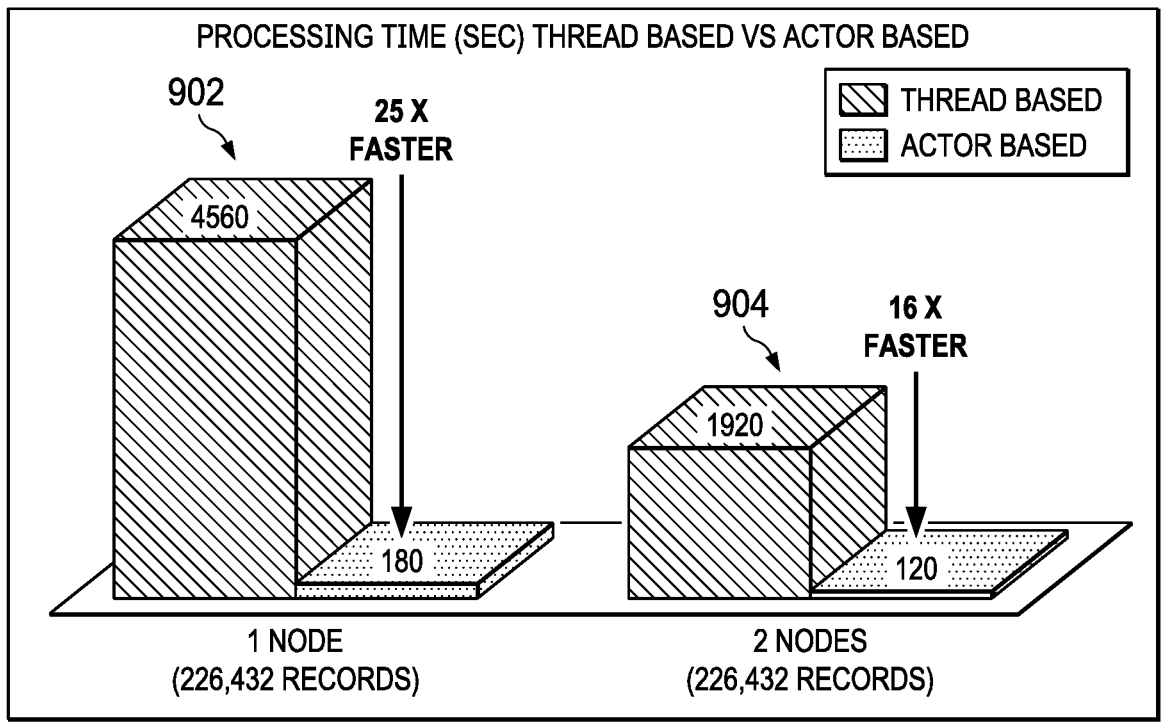
FIG. 9 is an illustration of bar graphs comparing processing times for a thread-based integration system with processing times for an actor-based integration system in accordance with an illustrative embodiment.

With reference next to FIG. 9, an illustration of bar graphs comparing processing times for a thread-based integration system with processing times for an actor-based integration system according to an illustrative example. In this illustrative example, an actor system, such as actor system 700 in FIG. 7, is implemented in an application interface, such as application interface 604 of FIG. 6.

FIG. 9 illustrates a comparison of the accessing and transformation of data in the context of records. In this illustrative example, application interface 604 transforms piece 440 of information 404 from a first one of formats 416 that is used to store information 404 in location 408. Application interface 604 transforms piece 440 of information 404 into a second one of formats 416 that is used by application 436 to perform operation 448.

As illustrated by single node example 902, processing times for a single node of an actor-based system are 25 times faster than a comparable thread-based system. When the system is scaled to two nodes, as illustrated by two-node example 904, processing times for a single node of an actor-based system are 16 times faster than a comparable thread-based system.

Figure 10:
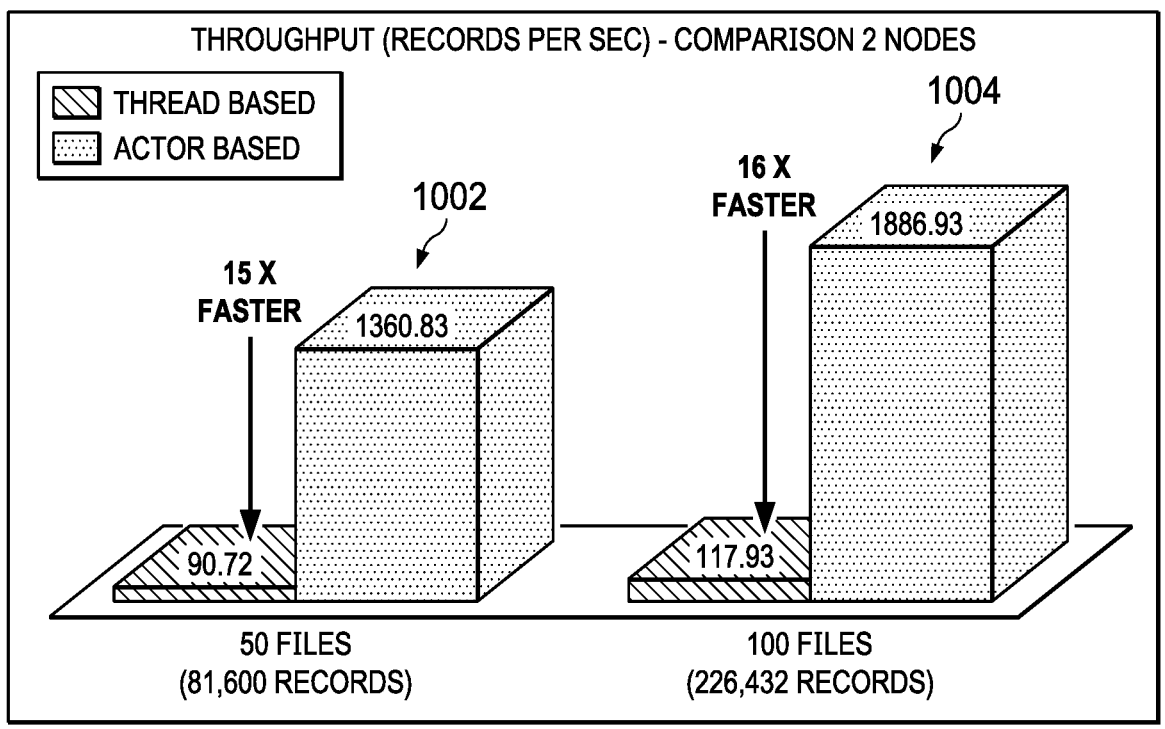
FIG. 10 is an illustration of bar graphs comparing processing times for an thread-based integration system with processing times for an actor-based integration system in accordance with an illustrative embodiment.

With reference next to FIG. 10, an illustration of bar graphs comparing processing times for a thread-based integration system with processing times for an actor-based integration system is depicted in accordance with an illustrative embodiment. In this illustrative example, an actor system, such as actor system 700 in FIG. 7, is implemented in an application interface, such as application interface 604 of FIG. 6.

As illustrated by example 1002, throughput rates for a two node of an actor-based system are 15 times faster than a comparable thread-based system when processing an equivalent number of files. When the number of files was doubled, as illustrated by example 1004, throughput rate for a two node of an actor-based system are 16 times faster than a comparable thread-based system.

Figure 11:
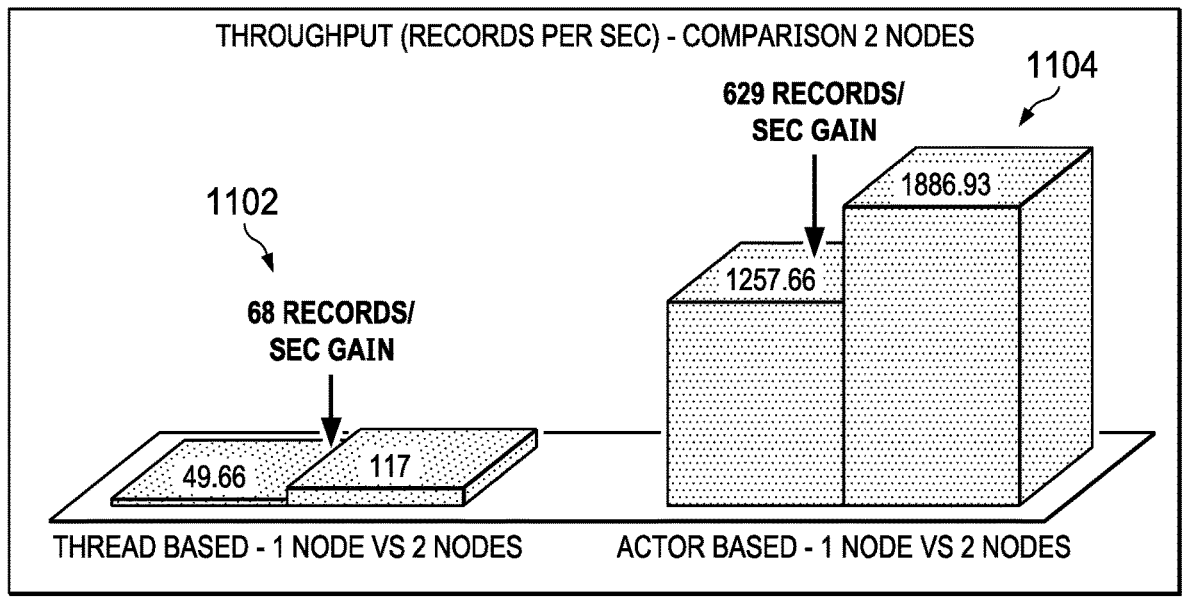
FIG. 11 is an illustration of bar graphs comparing horizontal scalability for an thread-based integration system with processing times for an actor-based integration system in accordance with an illustrative embodiment.

With reference next to FIG. 11, an illustration of bar graphs comparing horizontal scalability for an thread-based integration system with processing times for an actor-based integration system is depicted in accordance with an illustrative example.

As illustrated by example 1102, throughput rates for a thread-based system increased by 68 records per second when the system was scaled from one node to two nodes. As illustrated by example 1104, throughput rates for an actor-based system increased by 629 records per second when the system was scaled from one node to two nodes.

Figure 12:
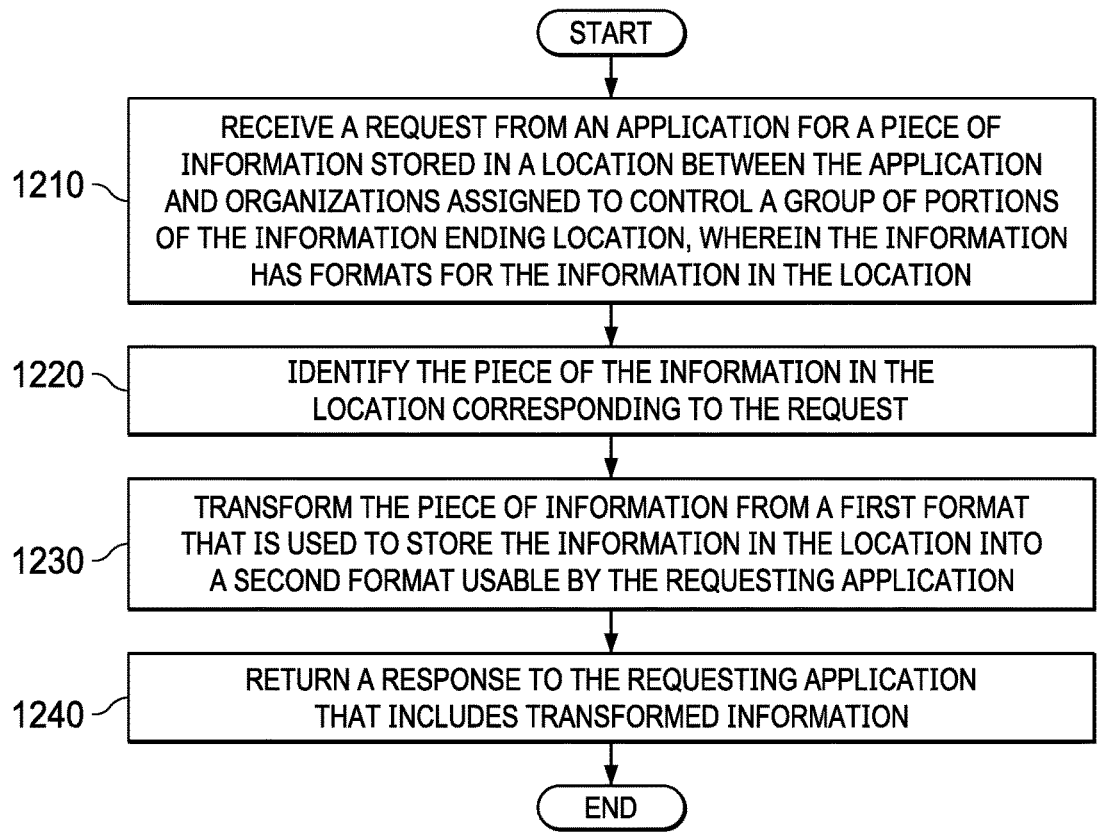
FIG. 12 is a flowchart of a process for accessing information using an actor-based integration system in accordance with an illustrative embodiment.

Turning next to FIG. 12, an illustration of a flowchart of a process for accessing information using an actor-based integration system is depicted in accordance with an illustrative embodiment. The process illustrated in FIG. 12 may be implemented in information environment 100 in FIG. 1. In particular, the process may be implemented in actor-based integration system 430 in computer system 410 in FIG. 4.

The process begins by receiving, by an actor-based integration system, a request from an application for a piece of information (step 1210). The information can be information 404 shown in block form in FIG. 4. The information is stored in a location, such as location 408, between a requesting application, such as application 436, and organizations, such as organization 406, assigned to control a group of portions of the information in the location. The information has formats for the information in the location.

The process identifies the piece of the information in the location corresponding to the request (step 1220). The process transforms the piece of information from a first format that is used to store the information in the location into a second format usable by the requesting application (step 1230).

The process returns a response to the requesting application that includes the transformed information (step 1240). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
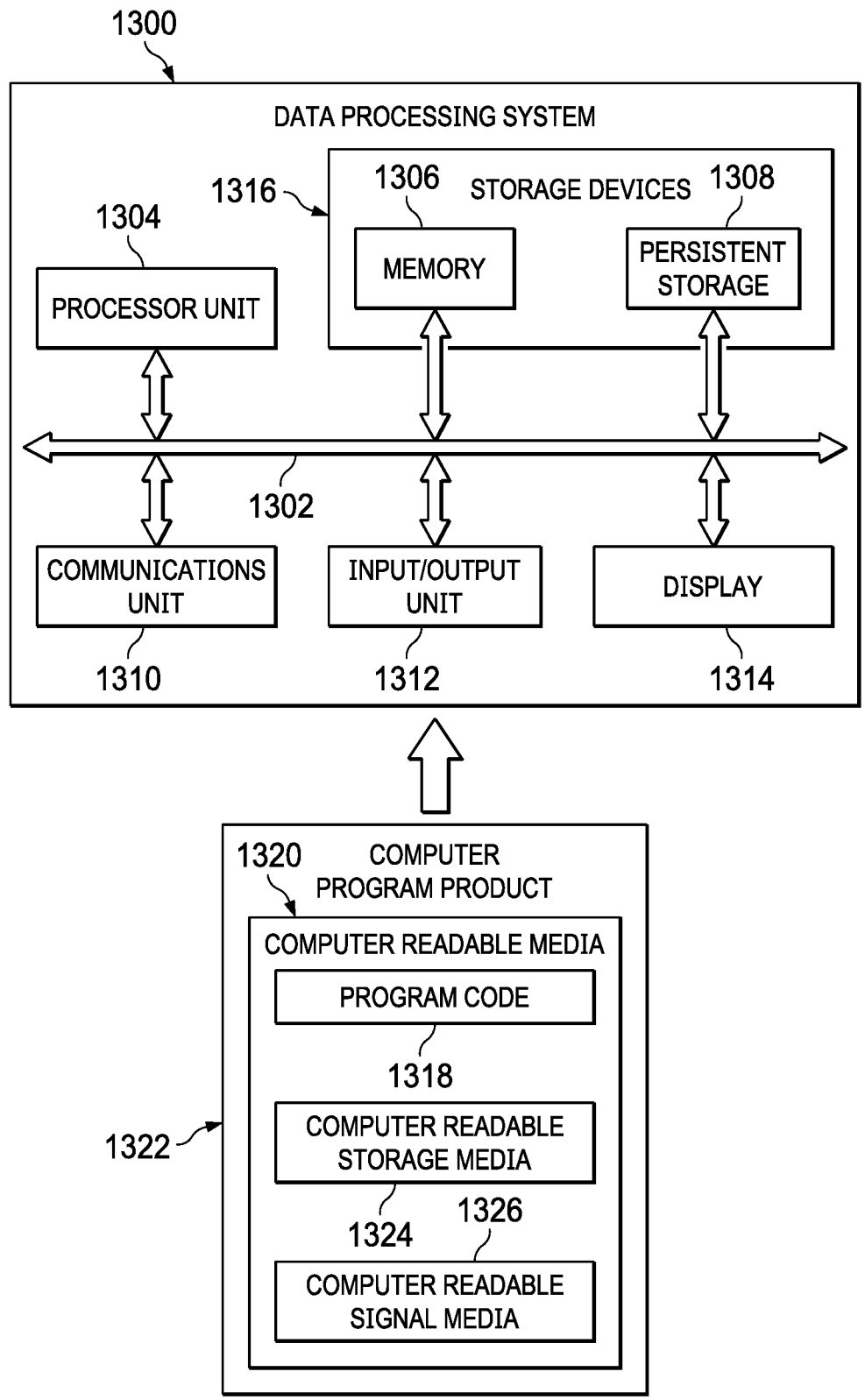
FIG. 13 is a block diagram of a data processing system in accordance with an illustrative embodiment.

Turning now to FIG. 13, a block diagram of a data processing system is depicted in accordance with an illustrative embodiment. Data processing system 1300 may be used to implement computer system 110 and client computer systems 134. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318. Alternatively, program code 1318 may be transferred to data processing system 1300 using computer readable signal media 1326. Computer readable signal media 1326 may be, for example, a propagated data signal containing program code 1318. For example, computer readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

Thus, the technical problem of processing information having different formats in an information system is solved through one or more technical solutions in the illustrative examples. In one illustrative example, a technical solution is present in which transforming formats for a portion of the information that are controlled by a limited number of sources is accelerated.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system of model-based access and format control, comprising:
one or more processors, coupled with memory, to:
aggregate, via a first node of a plurality of nodes of an actor-based system communicatively coupled with each other, a plurality of portions of information comprising a first format, the plurality of portions of information provided by a plurality of sources and aggregated in a storage location in the first format;
generate, via a second node of the plurality of nodes of the actor-based system, using a model that applies i) rules used to provide a plurality of heterogeneous computing platforms with control over the plurality of portions of information and ii) formats used by the plurality of heterogeneous computing platforms to process the plurality of portions of information, an assignment list that maps the control over each portion of information of the plurality of portions of information to the plurality of heterogeneous computing platforms based on the rules and the formats associated with the plurality of heterogeneous computing platforms, wherein each portion of information is associated with a respective type of information assigned to one or more applications executable by a respective one of the plurality of heterogeneous computing platforms, wherein a first rule of the rules indicates at least one first computing platform of the plurality of heterogeneous computing platforms with control over a first portion of information of the plurality of portions of information, and a second rule of the rules indicates at least one second computing platform of the plurality of heterogeneous computing platforms with control over a second portion of information of the plurality of portions of information, and wherein a second format of the formats used by the at least one first computing platform is different from the first format for aggregating the plurality of portions of information and a third format of the formats used by the at least one second computing platform;
receive, via a third node of the plurality of nodes of the actor-based system from a network, a request from a first application of a plurality of applications executable by the at least one first computing platform, to control the first portion of information of the plurality of portions of information comprising at least one type of information, the request comprising an indication of the second format different from the first format, wherein the first portion of information is controlled via the second format by the at least one first computing platform, and wherein the second portion of information is controlled via the third format by the at least one second computing platform, wherein to control the portion of information comprises at least one of accessing or changing the portion of information;
determine, via a fourth node of the plurality of nodes of the actor-based system responsive to the request and based on the rules and the formats of the model, that the assignment list authorizes control of the first portion of information in the second format by the first application of the at least one first computing platform;
transform, via a fifth node of the plurality of nodes of the actor-based system responsive to the authorization according to the at least one type of information associated with the first portion of information, the first portion of information from the first format to the second format, wherein transforming the first portion of information from the first format reduces a number of formats for the at least one type of information of the first portion of information relative to the first portion of information aggregated in the storage location, wherein the at least one type of information of the plurality of portions of information is aggregated in the storage location in the first format for distribution to the plurality of heterogeneous computing platforms in different formats;
provide, to the first application via the network and responsive to the request and the reduction of the number of formats for the at least one type of information when transforming the first format to the second format, the first portion of information in the second format having the reduced number of formats for the at least one type of information; and
cause the first application executed on the at least one first computing platform to generate a graphical user interface for display on a display device of the at least one first computing platform, wherein the graphical user interface present the first portion of the information.

2. The system of claim 1, wherein the one or more processors are further configured to transform the portion of information from the first format to the second format based on the model that comprises a description of one or more formats of the plurality of portions of information.

3. The system of claim 1, wherein the one or more processors are further configured to transform the portion of information from the first format to the second format through an asynchronous exchange of messages between actors of the model.

4. The system of claim 1, wherein the one or more processors are further configured to notify one or more computing platforms of the plurality of heterogeneous computing platforms authorized to control the portion of information, based on a computing platform relationship defined by the model, that the portion of information has transformed from the first format to the second format responsive to a request from the at least one first computing platform.

5. The system of claim 1, wherein the one or more processors are further configured to transform the portion of information from the first format to the second format through a dynamic cluster of nodes, each node comprising an actor to provide a step of a transformation.

6. The system of claim 1, wherein the plurality of sources are configured to communicate through at least one of representational state transfer services or durable queues.

7. The system of claim 1, wherein the one or more processors are further configured to transform the portion of information from the first format to the second format via actors, wherein each actor is coupled with an independent memory.

8. The system of claim 1, wherein the request from the first application indicates search criteria which tests for values in the plurality of portions of information, the values indicating a match for the search criteria.

9. The system of claim 1, wherein the one or more processors are further configured to transform the portion of information from the first format to the second format by actors of the model executing a transformation through a concurrent execution of steps of the transformation by each actor.

10. The system of claim 1, wherein the one or more processors are further configured to transform the portion of information from the first format to the second format by delegating, through a hierarchy of actors each performing a task, steps of a transformation to each actor.

11. A method of model-based access and format control, comprising:
    aggregating, by one or more processors coupled with memory, via a first node of a plurality of nodes of an actor-based system communicatively coupled with each other, a plurality of portions of information comprising a first format, the plurality of portions of information provided by a plurality of sources and aggregated in a storage location in the first format;
    generating, via a second node of the plurality of nodes of the actor-based system, using a model that applies i) rules used to provide a plurality of heterogeneous computing platforms with control over the plurality of portions of information and ii) formats used by the plurality of heterogeneous computing platforms to process the plurality of portions of information, an assignment list that maps the control over each portion of information of the plurality of portions of information to the plurality of heterogeneous computing platforms based on the rules and the formats associated with the plurality of heterogeneous computing platforms, wherein each portion of information is associated with a respective type of information assigned to one or more applications executable by a respective one of the plurality of heterogeneous computing platforms, wherein a first rule of the rules indicates at least one first computing platform of the plurality of heterogeneous computing platforms with control over a first portion of information of the plurality of portions of information, and a second rule of the rules indicates at least one second computing platform of the plurality of heterogeneous computing platforms with control over a second portion of information of the plurality of portions of information, and wherein a second format of the formats used by the at least one first computing platform is different from the first format for aggregating the plurality of portions of information and a third format of the formats used by the at least one second computing platform;
    receiving, via a third node of the plurality of nodes of the actor-based system from a network, a request from a first application of a plurality of applications executable by the at least one first computing platform, to control the first portion of information of the plurality of portions of information comprising at least one type of information, the request comprising an indication of the second format different from the first format, wherein the first portion of information is controlled via the second format by the at least one first computing platform, and wherein the second portion of information is controlled via the third format by the at least one second computing platform, wherein to control the portion of information comprises at least one of accessing or changing the portion of information;
    determining, via a fourth node of the plurality of nodes of the actor-based system responsive to the request and based on the rules and the formats of the model, that the assignment list authorizes control of the first portion of information in the second format by the first application of the at least one first computing platform;
    transforming, via a fifth node of the plurality of nodes of the actor-based system responsive to the authorization according to the at least one type of information associated with the first portion of information, the first portion of information from the first format to the second format, wherein transforming the first portion of information from the first format reduces a number of formats for the at least one type of information of the first portion of information relative to the first portion of information aggregated in the storage location, wherein the at least one type of information of the plurality of portions of information is aggregated in the storage location in the first format for distribution to the plurality of heterogeneous computing platforms in different formats;
    providing, to the first application via the network and responsive to the request and the reduction of the number of formats for the at least one type of information when transforming the first format to the second format, the first portion of information in the second format having the reduced number of formats for the at least one type of information; and
    causing the first application executed on the at least one first computing platform to generate a graphical user interface for display on a display device of the at least one first computing platform, wherein the graphical user interface present the first portion of the information.

12. The method of claim 11, further comprising transforming the portion of information from the first format to the second format based on the model that comprises a description of one or more formats of the plurality of portions of information.

13. The method of claim 11, further comprising transforming the portion of information from the first format to the second format through an asynchronous exchange of messages between actors of the model.

14. The method of claim 11, further comprising notifying one or more computing platforms of the plurality of heterogeneous computing platforms authorized to control the portion of information, based on a computing platform relationship defined by the model, that the portion of information has transformed from the first format to the second format responsive to a request from the at least one first computing platform.

15. The method of claim 11, further comprising transforming the portion of information from the first format to the second format through a dynamic cluster of nodes, each node comprising an actor to provide a step of a transformation.

16. The method of claim 11, wherein the plurality of sources are configured to communicate through at least one of representational state transfer services or durable queues.

17. The method of claim 11, further comprising transforming the portion of information from the first format to the second format via actors, wherein each actor is coupled with an independent memory.

18. The method of claim 11, further comprising transforming the portion of information from the first format to the second format by actors of the model executing a transformation through a concurrent execution of steps of the transformation by each actor.

19. The method of claim 11, further comprising transforming the portion of information from the first format to the second format by delegating, through a hierarchy of actors each performing a task, steps of a transformation to each actor.

20. A non-transitory, computer-readable medium storing processor-executable instructions for model-based access and format control that, when executed by one or more processors, cause the one or more processors to:
- aggregate, via a first node of a plurality of nodes of an actor-based system communicatively coupled with each other, a plurality of portions of information comprising a first format, the plurality of portions of information provided by a plurality of sources and aggregated in a storage location in the first format;
- generate, via a second node of the plurality of nodes of the actor-based system, using a model that applies i) rules used to provide a plurality of heterogeneous computing platforms with control over the plurality of portions of information and ii) formats used by the plurality of heterogeneous computing platforms to process the plurality of portions of information, an assignment list that maps the control over each portion of information of the plurality of portions of information to the plurality of heterogeneous computing platforms based on the rules and the formats associated with the plurality of heterogeneous computing platforms, wherein each portion of information is associated with a respective type of information assigned to one or more applications executable by a respective one of the plurality of heterogeneous computing platforms, wherein a first rule of the rules indicates at least one first computing platform of the plurality of heterogeneous computing platforms with control over a first portion of information of the plurality of portions of information, and a second rule of the rules indicates at least one second computing platform of the plurality of heterogeneous computing platforms with control over a second portion of information of the plurality of portions of information, and wherein a second format of the formats used by the at least one first computing platform is different from the first format for aggregating the plurality of portions of information and a third format of the formats used by the at least one second computing platform;
- receive, via a third node of the plurality of nodes of the actor-based system from a network, a request from a first application of a plurality of applications executable by the at least one first computing platform, to control the first portion of information of the plurality of portions of information comprising at least one type of information, the request comprising an indication of the second format different from the first format, wherein the first portion of information is controlled via the second format by the at least one first computing platform, and wherein the second portion of information is controlled via the third format by the at least one second computing platform, wherein to control the portion of information comprises at least one of accessing or changing the portion of information;
- determine, via a fourth node of the plurality of nodes of the actor-based system responsive to the request and based on the rules and the formats of the model, that the assignment list authorizes control of the first portion of information in the second format by the first application of the at least one first computing platform;
- transform, via a fifth node of the plurality of nodes of the actor-based system responsive to the authorization according to the at least one type of information associated with the first portion of information, the first portion of information from the first format to the second format, wherein transforming the first portion of information from the first format reduces a number of formats for the at least one type of information of the first portion of information relative to the first portion of information aggregated in the storage location, wherein the at least one type of information of the plurality of portions of information is aggregated in the storage location in the first format for distribution to the plurality of heterogeneous computing platforms in different formats;
- provide, to the first application via the network and responsive to the request and the reduction of the number of formats for the at least one type of information when transforming the first format to the second format, the first portion of information in the second format having the reduced number of formats for the at least one type of information; and
- cause the first application executed on the at least one first computing platform to generate a graphical user interface for display on a display device of the at least one first computing platform, wherein the graphical user interface present the first portion of the information.

* * * * *